(12) United States Patent
Jariwala et al.

(10) Patent No.: US 6,297,308 B1
(45) Date of Patent: Oct. 2, 2001

(54) CHEMICAL COMPOSITIONS

(75) Inventors: Chetan P. Jariwala, Woodbury, MN (US); Henry C. Chang, Milpitas, CA (US); David S. Hill, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/414,411

(22) Filed: Oct. 7, 1999

(51) Int. Cl.[7] ............................. C08J 5/10; C08K 5/02; C08L 27/12
(52) U.S. Cl. ................. 524/462; 524/366; 524/463; 510/188; 510/202; 510/411; 510/412
(58) Field of Search ..................... 510/411, 412, 510/188, 202; 524/366, 462, 463

(56) References Cited

U.S. PATENT DOCUMENTS

| | | |
|---|---|---|
| 2,500,388 | 3/1950 | Simons . |
| 2,519,983 | 8/1950 | Simons . |
| 2,594,272 | 4/1952 | Kauck et al. . |
| 2,616,927 | 11/1952 | Kauck et al. . |
| 2,915,554 | 12/1959 | Ahlbrecht et al. . |
| 3,450,755 | 6/1969 | Ahlbrecht . |
| 3,900,372 | 8/1975 | Childs et al. . |
| 3,903,012 | 9/1975 | Brandreth . |
| 4,289,892 | 9/1981 | Soch . |
| 4,491,531 * | 1/1985 | Bargigia et al. ............... 252/153 |
| 4,788,339 | 11/1988 | Moore et al. . |
| 5,089,152 | 2/1992 | Flynn et al. . |
| 5,125,978 | 6/1992 | Flynn et al. . |
| 5,658,962 | 8/1997 | Moore et al. . |
| 5,750,797 | 5/1998 | Vitcak et al. . |
| 5,925,611 | 7/1999 | Flynn et al. . |

FOREIGN PATENT DOCUMENTS

| | | |
|---|---|---|
| 1294949 | 5/1969 | (DE) . |
| 2287432 | 5/1976 | (FR) . |
| WO 93 22868 | 11/1993 | (WO) . |

OTHER PUBLICATIONS

Encyclopedia of Chemical Technology, Kirk–Othmer, Fourth Ed., vol. 11, pp. 499–515, (1994), John Wiley & Sons.

* cited by examiner

Primary Examiner—James J. Seidleck
Assistant Examiner—U. K Rajgurn
(74) Attorney, Agent, or Firm—Daniel C. Schulte; Robert H. Jordan

(57) ABSTRACT

Described are chemical compositions comprising a fluorinated solvent and a nonionic, poly-fluoroalkyl, hydroxy-substituted surfactant.

22 Claims, 1 Drawing Sheet

CHEMICAL COMPOSITIONS

FIELD OF THE INVENTION

The invention relates to chemical compositions that can be useful for drying substrates, in particular to compositions comprising a fluorinated solvent and a fluoroalkyl-substituted surfactant.

BACKGROUND

Removing water from processed articles or articles of manufacture is a manufacturing step in the production of many commercial product components and commercial products. Known methods for removing water from substrates include evaporation, centrifugation, absorption, and solvent drying, with each of these methods having certain advantages and disadvantages.

Solvent drying by water displacement has been a preferred method for drying electronic components, magnetic media, and associated products such as disk drive heads. A variety of fluorinated solvents have been used in solvent drying and/or cleaning processes including, e.g., chlorofluorocarbons (CFCs), hydrofluorocarbons (HFCs), hydrochlorofluorocarbons (HCFCs), and perfluorocarbon (PFCs).

Some articles of manufacture require or benefit from drying methods that can provide a surface that is spot-free, e.g., essentially free of residual water and other residues. For instance, semiconducting wafers can require an essentially impurity-free surface for later working. As such, the method used to dry such products can preferably permit drying to a surface that is "spot-free."

There exists a need for compositions which can be useful in drying methods, especially to meet the needs of spot-free drying applications.

SUMMARY OF THE INVENTION

Figure 1:
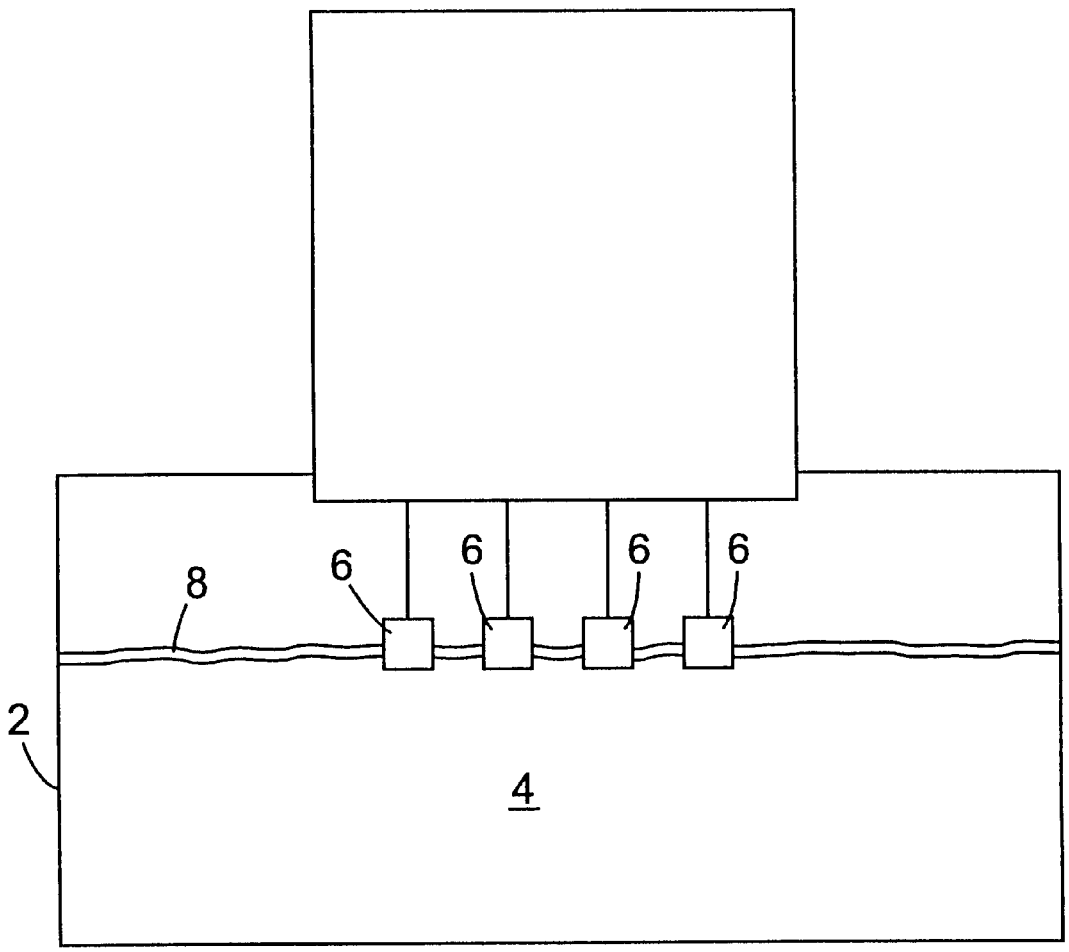
FIG. 1 illustrates the use of an embodiment of a composition of the invention in a drying process.

The invention provides chemical compositions that can be useful for effective drying of substrates, preferably leaving a spot-free surface. The compositions include a fluorinated solvent and a nonionic, poly-fluoroalkyl, hydroxy-substituted surfactant. Preferred nonionic, poly-fluoroalkyl, hydroxy-substituted surfactants can exhibit good solubility in a fluorinated solvent, can lower the surface tension of the fluorinated solvent, and most preferably will not form an emulsion or foam when combined with fluorinated solvent, optionally a small amount of water, and then agitated.

Preferred fluorinated solvents include hydrofluoroethers (HFEs), because compositions containing HFE solvent can exhibit low toxicity and flammability, ozone depletion potentials of zero, and can have short atmospheric lifetimes and low global warming potentials. Particularly preferred compositions can exhibit spot-free drying properties while being environmentally acceptable.

The invention relates to a composition comprising a fluorinated solvent and a nonionic, poly-fluoroalkyl, hydroxy-substituted surfactant. Preferred surfactants comprise nonionic, di-fluoroalkyl, poly-hydroxy-substituted compounds.

As used herein the term "spot-free" means that upon drying, substantially no contaminants or water spots remain on the surface of a substrate, as observed by an unaided human eye. A contaminant could be, for example, a mineral or surfactant remaining on a substrate surface, the mineral or surfactant having been previously dissolved in water dried from the substrate surface.

DETAILED DESCRIPTION OF PREFERRED EMBODIMENTS

Compositions of the invention comprise a fluorinated solvent and a nonionic, poly-fluoroalkyl-substituted, hydroxy-substituted surfactant.

The term "fluorinated solvent" is used as generally accepted in the art of organofluorine chemistry, and includes fluorinated organic compounds generally taking the form of a carbon backbone substituted with fluorine atoms and optionally substituted with hydrogen and/or chlorine or other halogen atoms; the carbon backbone can be interrupted by heteroatoms such as divalent oxygen, trivalent nitrogen, sulfur, etc. Examples of fluorinated solvents include hydrofluorocarbons (HFCs), perfluorocarbon (PFCs), hydrofluoroethers (HFEs), hydrohalofluoroethers (HEFEs) such as hydrochlorofluoroethers (HCFEs), chlorofluorocarbons (CFCs), and hydrochlorofluorocarbons (HCFCs), alone or as a mixture.

It can be especially desirable that the fluorinated solvent be non-flammable. This can mean that the fluorinated solvent has a flash point above about 100 degrees Fahrenheit. For a fluorinated solvent containing only fluorine, hydrogen, and carbon atoms (e.g., an HFC), and optional divalent oxygen atoms (e.g., an HFE) to be non-flammable, the relationship between the number of fluorine, hydrogen, and carbon atoms can be related in that the number of fluorine atoms per the number of combined hydrogen atoms and carbon-carbon bonds can be greater than or equal to about 0.8:

# of F atoms/(# H atoms+# C—C bonds)≧0.8.

In general, increasing the number of fluorine atoms, decreasing the number of hydrogen atoms, or decreasing the number of carbon-carbon bonds, each tend to increase the flash point of the fluorinated solvent.

Preferred fluorinated solvents can have a boiling point in the range from about 25° C. to about 275° C., preferably from about 50° C. to about 200° C., most preferably from about 50° C. to about 110° C. A particular fluorinated solvent to be used with a specific drying composition and process can be chosen based on these properties of the fluorinated solvent at a chosen set of operating temperature and pressure ranges. The fluorinated solvent can be straight-chained, branched, or cyclic, or a combination thereof, and is preferably free of unsaturation. The fluorinated solvent can preferably have from about 4 to about 20 carbon atoms, can preferably be normally liquid at operating conditions (e.g., room temperature), and preferably has a relatively low affinity for dissolving water, i.e., can absorb very little water (e.g., less than 1% by weight water can be absorbed in the liquid fluorinated solvent at operating conditions).

HFEs (also referred to as hydrofluoroethers or highly fluorinated ethers), generally include the class of organic chemical compounds minimally containing a carbon backbone substituted with carbon-bonded hydrogen and carbon-bonded fluorine atoms, and wherein the carbon backbone contains at least one divalent oxygen atom bonded to two saturated carbon atoms. The carbon backbone can be straight, branched, cyclic, or mixtures of these, and may also contain one or more additional skeletal heteroatoms such as a trivalent nitrogen or hexavalent sulfur, but preferably includes no functional or unsaturated groups. This definition for HFEs includes compounds having more than approximately 5 molar percent fluorine substitution, or less than approximately 95 molar percent fluorine substitution, based on the total number of hydrogen and fluorine atoms bonded to carbon, and specifically excludes organic compounds generally referred to as perhalogenated compounds, perfluorinated compounds, and hydrocarbon (non-fluorinated) compounds.

HFEs can be especially preferred fluorinated solvents because HFEs can exhibit relatively low toxicity, low ozone depletion potentials (e.g., zero), short atmospheric lifetimes, and low global warming potentials.

Useful HFEs include two identifiable varieties: segregated hydrofluoroethers, wherein each individual ether-bonded alkyl or alkylene, etc., segment of the HFE is either perfluorinated or non-fluorinated, but not partially fluorinated; and non-segregated hydrofluoroethers, wherein ether-bonded carbon groups can be non-fluorinated, perfluorinated, or partially fluorinated.

Segregated hydrofluoroethers can be described as comprising at least one mono-, di-, tri-, or poly-alkoxy-substituted perfluoroalkane, perfluorocycloalkane, perfluorocycloalkyl-containing perfluoroalkane, or perfluorocycloalkylene-containing perfluoroalkane compound. Such HFEs are described, for example, in U.S. Pat. No. 5,925,611 (incorporated herein by reference), and can be represented by formula 1:

$$R_f-(O-R_h)_x \quad (1)$$

wherein:

x can preferably be from 1 to about 3;

$R_f$ can be a perfluorinated hydrocarbon moiety having a valency x, which can be straight, branched, or cyclic, etc., or combinations thereof, and preferably contains from about 2 to 15 carbon atoms, more preferably from about 3 to 12 carbon atoms, and even more preferably from about 3 to 10 carbon atoms;

each $R_h$ can independently be a linear or branched alkyl group having from 1 to about 8 carbon atoms, a cycloalkyl-containing alkyl group having from 4 to about 8 carbon atoms, or a cycloalkyl group having from about 3 to 8 carbon atoms;

wherein either or both of the groups $R_f$ and $R_h$ can optionally contain one or more heteroatoms within the carbon backbone;

wherein the sum of the number of carbon atoms in the $R_f$ group and the number of carbon atoms in the $R_h$ group or groups is preferably greater than or equal to 4.

Preferably x is 1, $R_f$ is a perfluoroalkyl comprising from about 3 to 12 carbons optionally containing one or more heteroatoms, and $R_h$ is an alkyl group having from 1 to about 6 carbon atoms.

Most preferably x is 1; $R_f$ is a linear or branched perfluoroalkyl moiety having from about 3 to 8 carbon atoms, a perfluorocycloalkyl-containing perfluoroalkyl group having from about 5 to 15, more preferably 5 to 8 carbon atoms, or a perfluorocycloalkyl group having from about 3 to 12, more preferably 5 to 6 carbon atoms; $R_h$ is an alkyl group having from 1 to about 3 carbon atoms; and $R_f$ but not $R_h$ can optionally contain one or more heteroatom.

Representative segregated hydrofluoroethers include but are not limited to the following compounds:

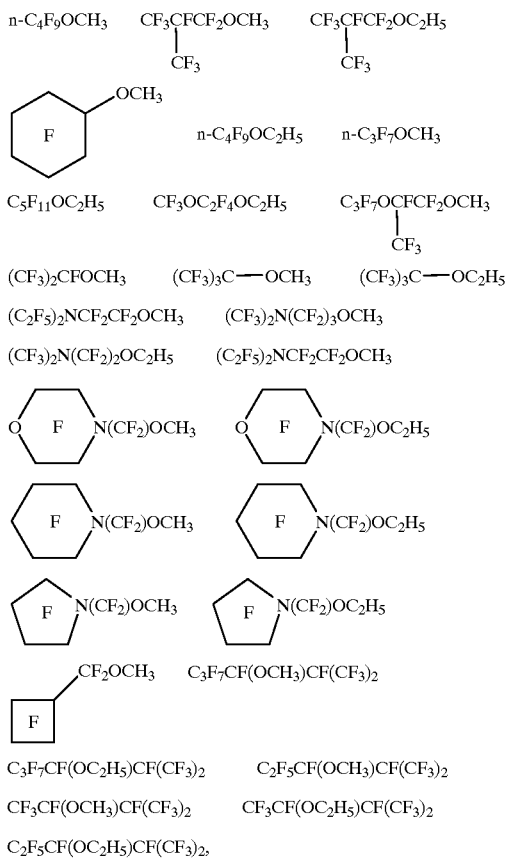

wherein cyclic structures designated with an interior "F" are perfluorinated.

Particularly preferred segregated HFEs include n-$C_3F_7OCH_3$, $(CF_3)_2CFOCH_3$, n-$C_4F_9OCH_3$, $(CF_3)_2CFCF_2OCH_3$, n-$C_3F_7OC_2H_5$, n-$C_4F_9OC_2H_5$, $(CF_3)_2CFCF_2OC_2H_5$, $(CF_3)_3COCH_3$, $(CF_3)_3COC_2H_5$, $CF_3CF(OCH_3)CF(CF_3)_2$, $CF_3CF(OC_2H_5)CF(CF_3)_2$, $CF_3CF(OCH_3)C_2F_5$, $CF_3CF(OC_2H_5)C_2F_5$, and mixtures thereof. Commercially available segregated HFEs include 3M™ NOVEC™ HFE-7100 and HFE-7200 Specialty Liquids, available from Minnesota Mining and Manufacturing Company, St. Paul, Minn.

As is known in the chemical art, segregated hydrofluoroethers can be prepared by alkylation of perfluorinated alkoxides prepared by the reaction of a corresponding perfluorinated acyl fluoride or perfluorinated ketone with an anhydrous alkali metal fluoride (e.g., potassium fluoride or cesium fluoride) or anhydrous silver fluoride in an anhydrous polar aprotic solvent. (See, e.g., the preparative methods described in French Patent Publication No. 2,287,432 and German Patent Publication No. 1,294,949). Alternatively, a fluorinated tertiary alcohol can be allowed to react with a base (e.g., potassium hydroxide or sodium hydroxide) to produce a perfluorinated tertiary alkoxide which can then be alkylated by reaction with an alkylating agent, such as described in U.S. Pat. No. 5,750,797, incorporated herein by reference.

Suitable alkylating agents for use in the preparation of segregated hydrofluoroethers include dialkyl sulfates (e.g., dimethyl sulfate), alkyl halides (e.g., methyl iodide), alkyl p-toluenesulfonates (e.g., methyl p-toluenesulfonate), alkyl perfluoroalkanesulfonates (e.g., methyl perfluoromethanesulfonate), and the like. Suitable polar aprotic solvents include acyclic ethers such as diethyl ether, ethylene glycol dimethyl ether, and diethylene glycol dimethyl ether; carboxylic acid esters such as methyl formate, ethyl formate, methyl acetate, diethyl carbonate, propylene carbonate, and ethylene carbonate; alkyl nitriles such as acetonitrile; alkyl amides such as N,N-dimethylformamide, N,N-diethylformamide, and N-methylpyrrolidone; alkyl sulfoxides such as dimethyl sulfoxide; alkyl sulfones such as dimethylsulfone, tetramethylene sulfone, and other sulfolanes; oxazolidones such as N-methyl-2-oxazolidone; and mixtures thereof.

Suitable perfluorinated acyl fluorides can be prepared by electrochemical fluorination (ECF) of the corresponding hydrocarbon carboxylic acid (or a derivative thereof), using either anhydrous hydrogen fluoride (Simons ECF) or $KF_2HF$ (Phillips ECF) as the electrolyte. Perfluorinated acyl fluorides and perfluorinated ketones can also be prepared by dissociation of perfluorinated carboxylic acid esters (which can be prepared from the corresponding hydrocarbon or partially-fluorinated carboxylic acid esters by direct fluorination with fluorine gas). Dissociation can be achieved by contacting the perfluorinated ester with a source of fluoride ion under conditions suitable to cause reaction (see the method described in U.S. Pat. No. 3,900,372 (Childs), the description of which is incorporated herein by reference), or by combining the ester with at least one initiating reagent such as a gaseous, nonhydroxylic nucleophile, a liquid, non-hydroxylic nucleophile, or a mixture of at least one non-hydroxylic nucleophile (gaseous, liquid, or solid) and at least one solvent which is inert to acylating agents.

Useful non-segregated HFEs include alpha-, beta-, and omega-substituted hydrofluoroalkyl ethers such as those described in U.S. Pat. No. 5,658,962 (Moore et al.), incorporated herein by reference, which can be described by the general structure of formula 2:

$$X-[R_f^1-O]_y R^2 H \qquad (2)$$

wherein:
X is either F, H, or a perfluoroalkyl containing from 1 to 3 carbon atoms;
each $R_f^1$ is independently a divalent perfluoroalkylene moiety such as $-CF_2-$, $-C_2F_4-$, $-C_3F_6-$, etc;
$R^2$ is a divalent organic moiety having from 1 to about 3 carbon atoms, which can be a divalent hydrocarbon, hydrofluorocarbon, or perfluorocarbon, and is preferably a divalent perfluorocarbon; and
y is an integer from 1 to 7, preferably from about 1 to 3; and wherein when X is F, $R^2$ contains at least one fluorine atom.

Representative non-segregated HFEs include but are not limited to the following:

$C_4F_9OC_2F_4H$ $HC_3F_6OC_3F_6H$ $HC_3F_6OCH_3$ $C_5F_{11}OC_2F_4H$ $C_6F_{13}OCF_2H$ $C_3F_7OCH_2F$ $C_3F_7O[CF(CF_3)CF_2O]_pCF(CF_3)H$, wherein p=0 to 5

$HCF_2O(C_2F_4O)_n(CF_2O)_mCF_2H$, wherein m=0 to 5 and n=0 to 5

$HCF_2OC_2F_4OCF_2H$ $HCF_2OCF_2OCF_2OCF_2H$ $HCF_2OC_2F_4OC_2F_4OCF_2H$ $HCF_2OCF_2OCF_2H$ $HCF_2OCF_2OC_2F_4OCF_2H$

Preferred non-segregated HFEs include $C_4F_9OC_2F_4H$, $C_6F_{13}OCF_2H$, $HC_3F_6OC_3F_6H$, $C_3F_7OCH_2F$, $HCF_2OCF_2OCF_2H$, $HCF_2OCF_2CF_2OCF_2H$, $HC_3F_6OCH_3$, $HCF_2OCF_2OC_2F_4OCF_2H$, and mixtures thereof. Non-segregated HFEs are commercially available e.g., from Ausimont Corp., Milano, Italy, under the "GALDEN H" trade name.

Non-segregated hydrofluoroethers can be prepared by decarboxylation of a corresponding precursor fluoroalkyl ether carboxylic acid or a salt thereof, or the saponifiable alkyl esters thereof, as described in U.S. Pat. No. 5,658,962, incorporated herein by reference. Alternatively, non-segregated hydrofluoroethers can be prepared by reduction of a corresponding omega-chlorofluoroalkyl ether (e.g., those omega-chlorofluoroalkyl ethers described in WO 93/11868 published application), as is also described in U.S. Pat. No. 5,658,962.

Another class of fluorinated solvent is the class of hydrofluorocarbons (HFCs). As used herein the term HFC generally includes the class of organic chemical compounds minimally containing a carbon backbone substituted with carbon-bonded hydrogen and carbon-bonded fluorine atoms, and wherein the carbon backbone contains no divalent oxygen atom bonded to two (saturated) carbon atoms. The carbon backbone can be straight, branched, cyclic, or mixtures of these, and may also contain one or more additional skeletal heteroatoms such as a trivalent nitrogen or hexavalent sulfur, but preferably includes no functional or unsaturated groups. This definition for HFC includes compounds having more than approximately 5 molar percent fluorine substitution, or less than approximately 95 molar percent fluorine substitution, based on the total number of hydrogen and fluorine atoms bonded to carbon, and specifically excludes organic compounds generally referred to as perhalogenated compounds, perfluorinated compounds, and hydrocarbon (non-fluorinated) compounds.

Useful hydrofluorocarbons can include the following:
linear or branched hydrofluorobutane compounds including those of formula 3:

$$C_4H_nF_{10-n}, \text{ wherein n is preferably } <5; \qquad (3)$$

representative compounds include $CHF_2(CF_2)_2CF_2H$, $CF_3CF_2CH_2CH_2F$, $CF_3CH_2CF_2CH_2F$, $CH_3CHFCF_2CF_3$, $CF_3CH_2CH_2CF_3$, $CH_2FCF_2CF_2CH_2F$, $CHF_2CH(CF_3)CF_3$, and $CHF(CF_3)CF_2CF_3$.

linear or branched hydrofluoropentane compounds of formula 4:

$$C_5H_nF_{12-n}, \text{ wherein n is preferably } <6; \qquad (4)$$

representative compounds include $CF_3CH_2CHFCF_2CF_3$, $CF_3CHFCH_2CF_2CF_3$, $CF_3CH_2CF_2CH_2CF_3$, $CF_3CHFCHFCF_2CF_3$, $CF_3CH_2CH_2CF_2CF_3$, $CH_3CHFCF_2CF_2CF_3$, $CF_3CF_2CF_2CH_2CH_3$, $CH_3CF_2CF_2CF_2CF_3$, $CF_3CH_2CHFCH_2CF_3$, $CH_2FCF_2CF_2CF_2CF_3$, $CHF_2CF_2CF_2CF_2CF_3$, $CH_3CF(CHFCHF_2)CF_3$, $CH_3CH(CF_2CF_3)CF_3$, $CHF_2CH(CHF_2)CF_2CF_3$, $CHF_2CF(CHF_2)CF_2CF_3$, and $CHF_2CF_2CF(CF_3)_2$;

linear or branched hydrofluorohexane compounds of formula 5:

$$C_6H_nF_{14-n}, \text{ wherein n is preferably} <7; \tag{5}$$

representative compounds include, $(CF_3CH_2)_2CHCF_3$, $CH_3CHFCF_2CHFCHFCF_3$, $HCF_2CHFCF_2CF_2CHFCF_2H$, $H_2CFCF_2CF_2CF_2CF_2CF_2H$, $CHF_2CF_2CF_2CF_2CF_2CHF_2$, $CH_3CF(CF_2H)CHFCHFCF_3$, $CH_3CF(CF_3)CHFCHFCF_3$, $CH_3CF(CF_3)CF_2CF_2CF_3$, $CHF_2CF_2CH(CF_3)CF_2CF_3$, and $CHF_2CF_2CF(CF_3)CF_2CF_3$;

linear or branched hydrofluoroheptane compounds of formula 6:

$$C_7H_nF_{16-n}, \text{ wherein n is preferably} <8 \tag{6}$$

representative compounds include $CH_3CHFCH_2CF_2CHFCF_2CF_3$, $CH_3(CF_2)_5CH_3$, $CH_3CF_2C(CF_3)_2CF_2CH_3$, $CH_3CH_2(CF_2)_4CF_3$, $CF_3CH_2CH_2(CF_2)_3CF_3$, $CH_2FCF_2CHF(CF_2)_3CF_3$, $CF_3CF_2CF_2CHFCHFCF_2CF_3$, $CF_3CF_2CF_2CHFCF_2CF_2CF_3$, $CH_3CH(CF_3)CF_2CF_2CF_2CH_3$, $CH_3CF(CF_3)CH_2CFHCF_2CF_3$, $CH_3CF(CF_2CF_3)CHFCF_2CF_3$, $CH_3CH_2CH(CF_3)CF_2CF_2CF_3$, $CHF_2CF(CF_3)(CF_2)_3CH_2F$, $CHF_2CF(CF_3)(CF_2)_3CF_3$, $CF_3CHFCHFC_4F_9$, $CF_3CF_2CHFC_3F_7$, $CF_3CHFCH_2C_4F_9$, $CF_3CH_2CHFC_4F_9$, $CF_3CF_2CH_2CHFC_3F_7$, and $CF_3CF_2CHFCH_2C_3F_7$;

and fluorinated cyclopentane compounds, e.g., $C_5H_nF_{10-n}$, wherein n is preferably <5:

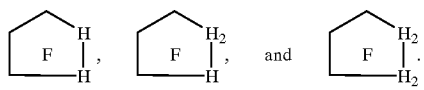

(7)

Particularly preferred HFCs include $CF_3CFHCFHCF_2CF_3$, $C_5F_{11}H$, $C_6F_{13}H$, $CF_3CF_2CH_2CH_2F$, $CHF_2CF_2CF_2CHF_2$, 1,2-dihydroperfluorocyclopentane, and 1,1,2-trihydroperfluorocyclopentane.

HFCs can be prepared by methods well known and understood in the fluorochemical art, and are commercially available, for example, under the "VERTREL" trade name, from E. I. DuPont de Numours, Wilmington, Del., and under the "ZEORORA-H" trade name from Nippon Zeon, Tokyo, Japan. Useful HFCs also include those described in the Encyclopedia of Chemical Technology, Kirk-Othmer, Fourth Ed., Vol. 11, pages 499–515, (1994).

Useful PFCs have molecular structures which can be straight-chained, branched, or cyclic, or a combination thereof, such as perfluoroalkylcycloaliphatic, are at least 95 molar percent fluorinated based on the total number of hydrogen and fluorine atoms bonded to carbon, and are preferably free of ethylenic unsaturation. The skeletal chain of the PFC can contain one or more skeletal heteroatoms such as divalent oxygen, a trivalent nitrogen, or a hexavalent sulfur, bonded only to carbon atoms. The PFC compound can preferably have about 5 to about 12 carbon atoms, the maximum number being dictated by the desired boiling point. U.S. Pat. No. 2,500,388 (Simons), U.S. Pat. No. 2,519,983 (Simons), U.S. Pat. No. 2,594,272 (Kauck et al.), U.S. Pat. No. 2,616,927 (Kauck et al.), and U.S. Pat. No. 4,788,339 (Moore et al.), all of which are herein incorporated by reference, describe the preparation of perfluorinated compounds such as perfluorinated hydrocarbons, ethers, tertiary amines and aminoethers. PFCs useful in this invention also include those described in Encyclopedia of Chemical Technology, Kirk-Othmer, Fourth Ed., Vol. 11, pages 499–515, John Wiley & Sons (1994). Useful PFC compositions can contain only a single PFC compound, but are typically a mixture of one or more PFC compounds.

Examples of useful PFCs include perfluoro-4-methylmorpholine, perfluorotriethylamine, perfluoro-2-ethyltetrahydrofuran, perfluoro-2-butyltetrahydrofuran, perfluoropentane, perfluoro(2-methylpentane), perfluorohexane, perfluoro-4-isopropylmorpholine, perfluorodibutyl ether, perfluoroheptane, perfluorooctane, perfluorotripropylamine, perfluorononane, perfluorotributylamine, perfluorodihexyl ether, perfluoro[2-(diethylamino)ethyl-2-(N-morpholino) ethyl]ether, n-perfluorotetradecahydrophenanthrene, and mixtures thereof. Preferred inert fluorochemical liquids include perfluoro-4-methylmorpholine perfluorotributylamine, perfluorohexane, perfluoro-2-butyltetrahydrofuran, perfluoroheptane and perfluorooctane, with perfluoro-4-methylmorpholine being especially preferred. Commercially available PFCs useful in this invention include FLUORINERT™ fluids, e.g., FC-72, FC-75, FC-77 and FC-84, described in the 1990 product bulletin #98-0211-5347-7(101.5) NPI, FLUORINERT™ fluids, 3M™ PF-5052, and mixtures thereof. All of these PFCs are available from 3M Company, St. Paul, Minn.

HHFEs are ether compounds containing fluorine, non-fluorine halogen (i.e., chlorine, bromine, and/or iodine) and hydrogen atoms. A subclass of HHFEs is perfluoroalkylhaloethers (PFAHEs). PFAHEs are defined as ether compounds wherein one side of the ether oxygen atom is a perfluoroalkyl group and the other side of the ether oxygen atom is a carbon backbone substituted with carbon-bonded hydrogen atoms and halogen atoms, wherein at least one of the halogen atoms is chlorine, bromine, or iodine. Useful PFAHEs include those described by the general structure shown in formula 8:

$$R_f^2\text{—O—}C_aH_bF_cX_d \tag{8}$$

wherein $R_f^2$ is a perfluoroalkyl group preferably having at least about 3 carbon atoms, most preferably from 3 to 10 carbon atoms, and optionally containing a skeletal heteroatom such as nitrogen or oxygen; X is a halogen atom selected from bromine, iodine, and chlorine; "a" preferably is from about 1 to 6; "b" is at least 1; "c" can range from 0 to about 2; "d" is at least 1; and b+c+d is equal to 2a+1. Such PFAHEs are described in PCT Publication WO 99/14175, which is incorporated herein by reference. Exemplary PFAHEs include c-$C_6F_{11}$—$OCHCl_2$, c-$C_6F_{11}$—$OCH_2Cl$, $(CF_3)_2CFOCHCl_2$, $(CF_3)_2CFOCH_2Cl$, $CF_3CF_2CF_2OCH_2Cl$, $CF_3CF_2CF_2OCH_2Cl$, $(CF_3)_2CFCF_2OCHCl_2$, $(CF_3)_2CFCF_2OCH_2Cl$, $CF_3CF_2CF_2CF_2OCHCl_2$, $CF_3CF_2CF_2CF_2OCHCl_2$, c-$C_6F_{11}$—$CF_2OCHCl_2$, c-$C_6F_{11}$—$CH_2OCH_2Cl$, $(CF_3)_2CFCF_2OCHClCH_3$, $CF_3CF_2CF_2CF_2OCHClCH_3$, perfluoropiperidino-$CF_2CF_2CF_2OCHCl_2$, perfluoropiperidino-$CF_2CF_2OCH_2Cl$, $(CF_3)_2CFCF(C_2F_5)OCH_2Cl$ and $(CF_3)_2CFCF(C_2F_5OCHCl_2$, $(CF_3)_2CFCF_2OCH_2Br$, and $(CF_3)_2CFCF_2OCH_2I$.

HCFCs are organic compounds containing a carbon backbone substituted with carbon-bonded fluorine, chlorine, and hydrogen atoms. Useful HCFCs include $CF_3CHCl_2$, $CH_3CCl_2F$, $CF_3CF_2CHCl_2$ and $CClF_2CF_2CHClF$.

The nonionic, poly-fluoroalkyl, hydroxy-substituted surfactant can be any nonionic, poly-fluoroalkyl, hydroxy-substituted surfactant found to be useful, e.g., that when combined with a fluorinated solvent, can effect drying of a substrate, preferably spot-free drying. Nonionic, poly-fluoroalkyl, hydroxy-substituted surfactants are organic chemical compounds that are nonionic, that include substitution with at least two, optionally three or more fluorinated (e.g., hydrofluorinated or perfluorinated) alkyl groups, and that are substituted by at least one, preferably two, and optionally three or more hydroxyl groups. These compounds can optionally include additional chemical functional groups or skeletal heteroatom.

The nonionic, poly-fluoroalkyl, hydroxy-substituted surfactant can preferably be soluble in a fluorinated solvent at useful temperatures and pressures. Solubility of a surfactant in a fluorinated solvent will of course depend on temperature and pressure, and also on the chemical compositions of the solvent and the surfactant.

Preferred nonionic, poly-fluoroalkyl, hydroxy-substituted surfactants are not substantially extracted from a fluorinated solvent by water (e.g. they preferably exhibit less than about 1% solubility in water).

Nonionic, poly-fluoroalkyl, hydroxy-substituted surfactants that have been found to be useful in the invention include those having a structure according to formula 9:

wherein
m is at least 2, e.g., 2, 3, 4, etc.;
each $R_f^3$, the same or different, can be a fluoroalkyl group (e.g., an alkyl group that is partially or fully fluorinated); preferably $R_f^3$ has about 4 to 15 carbon atoms, more preferably about 4 to 8 carbon atoms; each $R_f^3$ may be linear, branched, or (if sufficiently large) cyclic, or a combination thereof; each $R_f^3$ is preferably free of polymerizable olefinic unsaturation but can optionally contain a skeletal heteroatom such as a divalent oxygen, a divalent or hexavalent sulfur, or a trivalent nitrogen; preferably, the terminal portion, approximately the last three carbons, of each $R_f^3$ is fully fluorinated, preferably containing at least 7 fluorine atoms, e.g., $CF_3CF_2CF_2-$, $(CF_3)_2CF-$ or $SF_5CF_2-$; alternatively, each $R_f^3$ may be fully fluorinated except for a terminal hydrogen atom, e.g., $H(CF_2)_n-$.
each Z can be the same or different, and is a divalent linking group such as $-SO_2N(R2)-$, $-C(O)N(R2)-$, $-(CH_2)_nO-$ (wherein n is preferably 1 to 3), and $-C_2H_4SO_2N(R2)-$, wherein R2 is an alkyl group preferably having up to 4 carbon atoms, more preferably 1 to 3 carbon atoms;
each $R^3$, the same or different, can be any suitable divalent alkylene moiety, such as a divalent, hydroxy-substituted alkylene moiety, e.g.,:

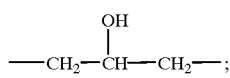

R can be an organic group having a valency m, e.g., 2, 3, 4, etc., such as a linear or branched divalent alkylene preferably having about 2 to 20 carbon atoms, optionally substituted with one or more hydroxy substituent, or a linear or branched divalent poly(oxyalkylene) group having about 2 to 20 carbon atoms and optionally substituted by one or more hydroxy substituent.

A class of particularly preferred nonionic, poly-fluoroalkyl, hydroxy-substituted surfactants includes nonionic, di-fluoroalkyl, poly-hydroxy-substituted surfactants of formula 10:

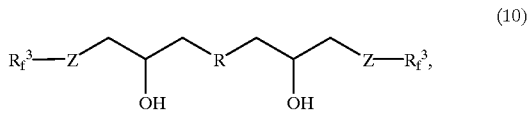

wherein:

each Z is independently a divalent linking group, preferably one of:

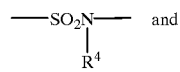 and

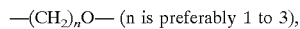

wherein $R^4$ is an alkyl, preferably methyl, ethyl, propyl, or butyl;

R preferably is selected from straight or branched alkylene, oxyalkylene, or polyoxyalkylene groups, optionally hydroxy-substituted, including:

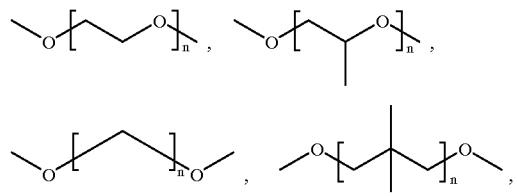

wherein n can preferably be from 1 to about 6,

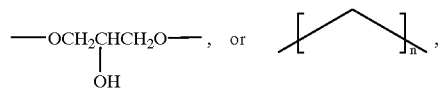

wherein n=1–15; and
each $R_f^3$ is independently a fluoroalkyl group, preferably a perfluoroalkyl group, as defined.

Specific examples of preferred nonionic, di-fluoroalkyl, poly-hydroxy-substituted surfactants include:

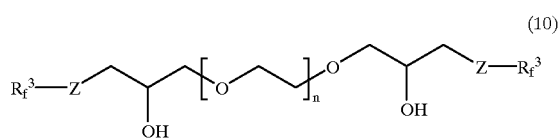

wherein n = 1-4,

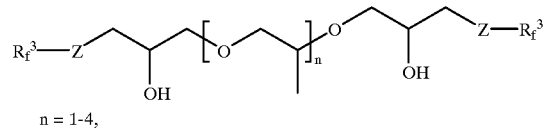

n = 1-4,

-continued

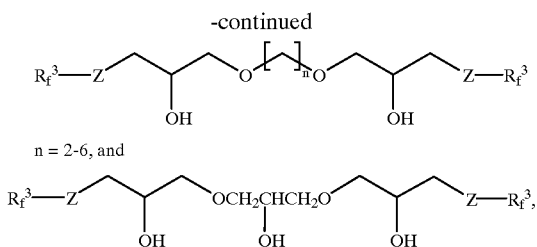

n = 2-6, and wherein each $R_f^3$ and Z are as defined. More specific examples include:

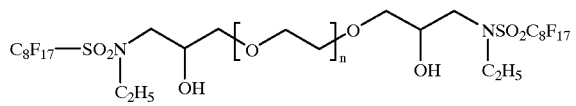

wherein n = 1-4, and

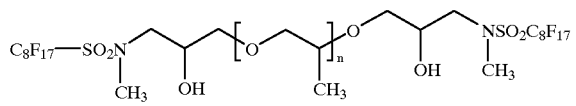

wherein n = 1-4.

These and other non-ionic, poly-fluoroalkyl, hydroxy-substituted surfactants can be prepared by methods known in the organic chemical art, such as by condensation of a polyalkylene or polyoxyalkylene epoxide (which can be optionally hydroxy-substituted), e.g., an alkyl-substituted polypropylene glycol diglycidyl ether, with a fluoroaliphatic compound containing at least one active hydrogen (e.g., a fluoroaliphatic sulfonamide). Surfactants prepared by these methods generally comprise mixtures of isomeric and homologous compounds. An example of a useful synthesis can be illustrated generically as follows:

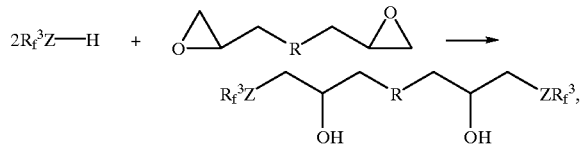

wherein each of R, Z, and $R_f^3$, is as defined. Alternatively, the reactive epoxy and amide groups could be interchanged, with the amide being attached to the polyalkylene or polyoxyalkylene, and the epoxide being attached to the fluoroalkyl group, and these compounds can be reacted to form the surfactant.

Useful reaction conditions will be apparent to a person skilled in the chemical art, but exemplary conditions can include combining the reactants for about 7 to 8 hours at 110 to 150 degrees Celsius, with an appropriate catalyst. An appropriate catalyst will also be well understood by a skilled artisan, but generally should not react with the epoxide or cause the epoxide to polymerize, yet should activate the hydrogen on the $R_f^3Z$—H group to allow reaction of the $R_f^3Z$— with the epoxide ring.

The composition can include fluorinated solvent and nonionic, poly-fluoroalkyl, hydroxy-substituted surfactant in amounts, e.g., in an amount useful to effect useful drying of substrate, preferably to dry a substrate to a spot free finish. Preferred amounts of fluorinated solvent and nonionic, poly-fluoroalkyl, hydroxy-substituted surfactant included in a composition can be amounts that provide a composition that when employed in a drying process, optionally with agitation, will not result in the production of a stable emulsion or foam. Preferred amounts of nonionic poly-fluoroalkyl, hydroxy-substituted surfactant to fluorinated solvent can be in the range from about 0.025 to 5 weight percent of the surfactant based on the weight of fluorinated solvent, with amounts in the range from about 0.05 wt % to 2 wt % surfactant to fluorinated solvent being particularly preferred. The composition can contain only a single species of nonionic poly-fluoroalkyl, hydroxy-substituted surfactant, or may comprise a mixture of two or more different nonionic, poly-fluoroalkyl, hydroxy-substituted surfactants.

The composition can also include other ingredients, the identity and amounts of which will be understood by a skilled artisan. For instance, the composition can include co-solvents or additional fluorinated or non-fluorinated surfactant.

The compositions can be useful for drying wet substrates by displacement of water, e.g., surface water. The wet substrate can be any article having water in contact with a surface, and can be organic or inorganic, natural or synthetic, or of any other physical or chemical nature that will allow surface water to be displaced according to the presently-described method. Representative examples of substrates include metals, ceramics, glass, polycarbonate, polystyrene, acrylonitrile-butadiene-styrene copolymer, and semiconducting materials. The process is especially useful in the precision cleaning and drying of electronic components (e.g., semiconductors, circuit boards, disk drive heads, magnetic disk media, and magnetic disk drive housings), electronic packaging, optical or magnetic media, and medical devices.

The drying process is believed to operate on a displacement principle, wherein liquid water along with any dissolved contaminant is displaced from a surface of a substrate by contacting the wet substrate with a described composition. "Contacting" can mean, for example, that the composition is poured, brushed, sprayed, misted, or otherwise applied to the wet substrate, that the substrate is dipped or otherwise submersed in the composition, or that the composition is in any other manner placed into contact with the wet substrate in a fashion that allows the composition to partially or fully displace water from the surface of the substrate. The composition can be used in either a gaseous or liquid state (or both), at elevated temperatures or pressures, and can preferably be used in combination with some type of agitation, such as agitation caused by boiling the composition, ultrasonic energy, or mechanical agitation.

If the process is accomplished by submersing the wet substrate in the composition, the process can be performed in any suitable container or vessel, such as in an open heated vessel equipped with means for agitation. Upon contacting the wet substrate with the composition, water from the wet substrate will be displaced, and will generally form a phase within the vessel that is separated from the fluorinated solvent. A preferred vessel can be equipped with means to remove such a separate water phase.

The substrate can preferably be contacted with the composition for a time sufficient to displace the surface water from the substrate, at which time the contact can be discontinued (e.g., the substrate can be removed from the composition). After contact is discontinued, the substrate is preferably dry, i.e., water-free, and is preferably residue-free (e.g., spot free). Further steps may be desirable, such as a rinse step to remove residual composition from the substrate, e.g., by contacting the dry substrate with a water-free, non-fluorinated or fluorinated solvent such as pure HFE or HFC.

Description of exemplary contacting and agitation steps for the process, and of exemplary substrates that can be dried by the process, can be found, e.g., in U.S. Pat. No. 5,089,152 (Flynn et al.), which description is incorporated herein by reference. See also U.S. Pat. No. 3,903,012 (Brandreth) and U.S. Pat. No. 5,125,978, each of which is incorporated herein by reference.

In a particularly preferred embodiment, as illustrated in FIG. 1, vessel 2 contains composition 4 in which one or more of substrates 6, having surface water thereupon, can be submerged. Submersion of substrate 6 in composition 4 causes displacement of the surface water from the surface of substrate 6, and the water is dispersed into composition 4 to form water phase 8. In this preferred embodiment, the composition can be agitated either by boiling the composition, or by other means of agitation such as the use of ultrasonic motion or mechanical agitation. Water phase 8 can be removed from vessel 2. When substantially all surface water has been displaced from wet substrate 6, the substrate can be removed from the vessel and the composition. Preferably, in an optional second step (not illustrated) the dried substrate can be immersed in a neat solvent contained in another vessel to remove any residual surfactant.

Objects and advantages of this invention are further illustrated by the following examples, but the particular materials and amounts thereof recited in these examples, as well as other conditions and details, should not be construed to unduly limit this invention.

Synthesis of FC-Surfactants
Surfactant 1

In a 3-necked round bottom flask equipped with stirrer, thermometer, condenser and heating mantle were added 202 g (0.594 mol) of polypropylene glycol diglycidyl ether (available from Aldrich Chemical Co., Milwaukee, Wis., 609.6 g (1.188 mol) of N-methyl perfluorooctane sulfonamide and 0.1% (w/w) dimethylaminopyridine. The resulting mixture was heated to 110° C. in an inert atmosphere. An exotherm occurred which raised the temperature of the mixture to 150° C. The reaction flask was allowed to cool to 110° C., then heating of the reaction mixture continued for 7 hours. The temperature was raised and held at 150° C. and allowed to stir for another 2 hours. Heating was stopped and the liquid was poured into a jar.

Yield was measured to be 98% of theoretical. IR spectra of the reaction product showed a distinct —OH peak, indicating good reaction of the sulfonamide groups with the epoxy groups. NMR analysis of the reaction product showed spectra consistent with the desired product:

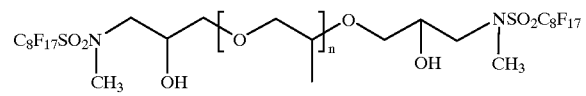

(n approximately equal to 1 to 4).
Surfactant 2

In a 3-necked round bottom flask equipped with stirrer, thermometer, condenser and heating mantle were added 96.5 g (0.427 mol) of Denacol™ EX-810 (polyethylene glycol diglycidyl ether, available from Nagase Chemical Co., Hyogo, Japan), 450 g (0.853 mol) of N-ethyl perfluorooctane sulfonamide and 0.1% (w/w) dimethylaminopyridine. The resulting mixture was heated to 110° C. in an inert atmosphere. An exotherm occurred which raised the temperature of the mixture to 150° C. The reaction flask was allowed to cool to 110° C., then heating of the reaction mixture continued for 7 hours. The temperature was raised and held at 150° C. and allowed to stir for another 2 hours. Heating was stopped and the viscous liquid was poured into a jar. IR spectra of the reaction product showed a distinct —OH peak, indicating good reaction of the sulfonamide groups with the epoxy groups. NMR analysis of the reaction product showed spectra consistent with the desired product:

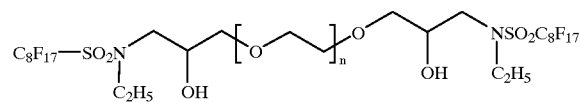

(n approximately equal to 1 to 2).
Surfactant 3

In a 3-necked round bottom flask equipped with stirrer, thermometer, condenser and heating mantle were added 10 g (0.0492 mol) of 1,3-glycerol diglycidyl ether (available from Monomer-polymer dajac Laboratory), 51.9 g (0.0984 mole) of N-ethyl perfluorooctane sulfonamide and 0.1% (w/w) dimethylaminopyridine. The resulting mixture was heated to 140–150° C. in an inert atmosphere for 7–8 hours. Heating was stopped and the viscous liquid was poured into a jar. IR spectra of the material showed a distinct —OH peak, indicating good reaction of the sulfonamide groups with the epoxy groups. NMR analysis of the reaction product showed spectra consistent with the desired product:

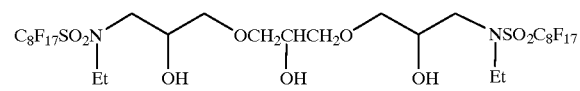

Surfactant 4

In a 3-necked round bottom flask equipped with stirrer, thermometer, condenser and heating mantle were added 25 g (0.0962 mol) of butanediol diglycidyl ether), 101.3 g (0.1923 mole) of N-ethyl perfluorooctane sulfonamide and 0.1% (w/w) ethyl triphenylphosphonium iodide. The resulting mixture was heated to 125° C. in an inert atmosphere for 7–8 hours. Heating was stopped and the viscous liquid was poured into ajar. IR spectra of this material showed a distinct increase in the —OH peak.

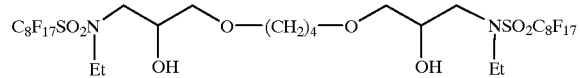

Surfactant 5

Surfactant 5, $C_4F_9SO_2N(CH_3)CH_2CH(OH)CH_2[OCH_2CH(CH_3)]_n$—$OCH_2CH(OH)CH_2N(CH_3)SO_2C_4F_9$, was prepared using essentially the same procedure for making Surfactant 1, except that an equimolar amount of N-methyl perfluorobutane sulfonamide was substituted for the N-methyl perfluorooctane sulfonamide.

Surfactant 6

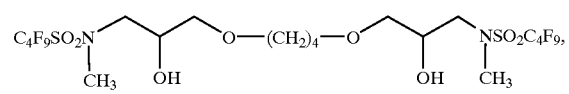

was prepared using essentially the same procedure for making Surfactant 4, except that an equimolar amount of N-methyl perfluorobutane sulfonamide was substituted for the N-ethyl perfluorooctane sulfonamide.

Surfactant 7

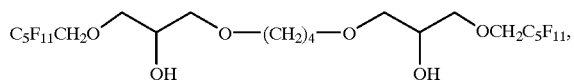

was prepared using essentially the same procedure for making Surfactant 4, except that an equimolar amount of 1,1-dihydroperfluorohexyl alcohol was substituted for the N-ethyl perfluorooctane sulfonamide.

Surfactant 8

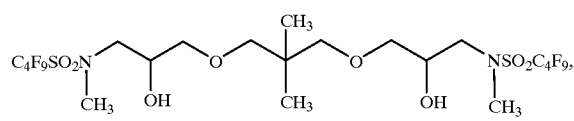

was prepared using essentially the same procedure for making Surfactant 4, except that in this case 2 moles of N-methyl perfluorobutane sulfonamide were reacted with 1 mole of neopentyl glycol diglycidyl ether (Heleoxy™ R-69, available from Shell Chemical Co., Houston, Tex.).

Spot-Free Drying Test Procedure

A small scale laboratory apparatus was set up and test procedure established to simulate the operation of a commercial spot-free drying machine in the drying of wet substrates. The apparatus consisted of two 1 liter beakers, each placed on a hot plate. The first beaker was used as the "cleaning sump" and was partially filled with spot-free drying composition (containing fluorinated solvent and surfactant). The second beaker was used as the "rinsing sump" and was partially filled with fluorinated solvent only. Wet substrates evaluated for drying were glass slides (VWR microslide, 25 mm×75 mm, available from VWR Scientific, Inc., West Chester, Pa.) and/or circuit boards (50 mm×66 mm FR4 boards containing a 14-pin through-hole ceramic dual in-line package, a 14-pin surface mounted plastic dual in-line package and a 20 lead ceramic chip carrier), representing substrates exhibiting the two extremes of very smooth surfaces and having very small crevices. The drying procedure was performed according to the following steps:

(1) The spot-free drying composition in the cleaning sump was heated to its boiling point, creating a saturated vapor phase above a boiling liquid phase.

(2) A spring-loaded metal clip was attached to the (dry) substrate to be evaluated and a wire was attached through a hole at the opposite end of the clip. (The wire was used as a convenient means for transporting the substrate throughout the various drying operations.) By holding the wire, the clean substrate was dipped for a few seconds in a beaker of deionized water at ambient temperature and then was removed, allowing the water to drain from the wet substrate for a few seconds.

(3) The wet substrate was immersed for 3 minutes in the boiling spot-free drying composition (i.e., the liquid phase) located in the cleaning sump.

(4) The substrate was raised from the solution zone into the saturated vapor zone for 1 minute, allowing the spot-free drying composition to drain from the substrate.

(5) The drained substrate was then immersed for 1 minute in the rinsing sump containing pure boiling fluorinated solvent.

(6) The rinsed substrate was allowed to dry under ambient conditions for several minutes.

The dried substrate was then examined for any water and/or spots remaining on the surface or in the small orifices of the dried substrate. Also, the drying composition was examined to determine whether (1) the removed water had desirably formed a well-defined second phase upon its surface or (2) an emulsion or foam had formed, indicating water and/or air entrapment in the spot-free drying composition.

EXAMPLES 1–4

Surfactants 1–4 were dissolved in HFE-7100 hydrofluoroether at 0.5% (w/w), and the resultant test spot-free drying compositions were evaluated for their ability to dry wet glass slides and wet circuit boards without forming emulsions or foams from water accumulated during the drying process.

Comparative Example C1

In Comparative Example C1, no surfactant was added to the HFE-7100 prior to running the Spot-Free Drying Test procedure.

Results are presented in TABLE 1.

TABLE 1

| | | Drying of: | | Emulsion/ |
|---|---|---|---|---|
| Ex. | Surfactant | Glass | Cir. Board | Foam |
| 1 | 1 | dry, no spots | dry, no spots | none |
| 2 | 2 | dry, no spots | dry, no spots | none |
| 3 | 3 | dry, no spots | dry, no spots | none |
| 4 | 4 | dry, minute spots | dry, minute spots | none |
| C1 | no surf | wet | wet | none |

The data in TABLE 1 show that drying compositions of HFE-7100 and Surfactants 1–4 exhibit excellent spot-free drying performance without causing emulsification or foaming. When no surfactant was added, poor spot-free drying performance resulted.

Comparative Examples C2–C8

Using the same procedure as described in Examples 1–4, several comparative fluorochemical surfactants were evaluated at 0.5% (w/w) in HFE-7100 or at their saturation concentration, whichever was less, for their ability to remove water from wet glass slides and wet circuit boards without forming emulsions or foams from water accumulated during the drying process. FC Alcohols A, B and C are disclosed in U.S. Pat. No. 5,089,152.

Results are presented in TABLE 2.

TABLE 2

| | Surfactant | Drying of: | | Emulsion/ |
|---|---|---|---|---|
| Ex. | Reference | Glass | Cir. Board | Foam |
| C2 | FC-170C [1] | not run, too insoluble | not run, too insoluble | not measured |
| C3 | FC-171 [2] | dry, no spots | dry, spotty | emulsion formed |
| C4 | FC Alcohol A [3] | dry, residue | dry, spotty | emulsion formed |

TABLE 2-continued

| | Surfactant | Drying of: | | Emulsion/ |
|---|---|---|---|---|
| Ex. | Reference | Glass | Cir. Board | Foam |
| C5 | FC Alcohol B [4] | dry | dry, spotty | emulsion formed |
| C6 | FC Alcohol C [5] | wet | wet | not measured |
| C7 | FC Amide D [6] | dry | dry | emulsion formed |
| C8 | FC Amide E [7] | wet | wet | none |

[1] FLUORAD ™ FC-170C fluorochemical surfactant, having the approximate structure $C_8F_{17}SO_2N(C_2H_5)(C_2H_4O)_{10}H$, available from 3M Company, St. Paul, Minnesota; FC-170C was run at a saturation concentration in HFE-7100, which was less than 0.2% (w/w).
[2] FLUORAD ™ FC-171 fluorochemical surfactant, having the approximate structure $C_8F_{17}SO_2N(C_2H_5)(C_2H_4O)_{7.5}H$, available from 3M Company, St. Paul, Minnesota.
[3] FC Alcohol A, a fluorochemical alcohol having the approximate structure $C_8F_{17}SO_2N(C_2H_5)(C_2H_4O)_{1-4}H$ (made according to the general procedure described in U.S. Pat. No. 2,915,554).
[4] FC Alcohol B, a fluorochemical alcohol having the approximate structure $C_4F_9OC_2F_4OCF_2CON(CH_3)(C_2H_4OH)_2$ (made according to the general procedure described in U.S. Pat. No, 4,289,892).
[5] FC Alcohol C, a fluorochemical alcohol having the approximate structure $CF_3(CF_2)_3O[CF(CF_3)CF_2O]_2CF(CF_3)CONHC_2H_4OH$ (made according to the general procedure described in U.S. Pat. No. 3,450,755).
[6] FC Amide D, a fluorochemical amide having the approximate structure $C_7F_{15}CONHCH(CH_3)CH_2[OCH(CH_3)CH_2\,_n$—$(OCH_2CH_2)_b[OCH_2C(CH_3)]_cCH_2CH(CH_3)NHCOC_7F_{15}$, where a + c is approximately 2.5 and b is approximately 9, made by reacting one mole of Jeffamine ™ 600 polyoxyalkylene diamine (available from Huntsman Chemical Corp., Salt Lake City, Utah) with two moles of $C_7F_{15}COF$.
[7] FC Amide E, a fluorochemical amide having the approximate structure $C_7F_{15}CONHCH(CH_3)CH_2[OCH(CH_3)CH_2]_n$—$(OCH_2CH_2)_b[OCH_2C(CH_3)]_cCH_2CH(CH_3)NHCOC_7F_{15}$, where a + c is approximately 2.5 and b is approximately 4, made by reacting one mole of Jeffamine ™ 400 polyoxyalkylene diamine (available from Huntsman Chemical Corp.) with two moles of perfluorooctanecarbonyl fluoride.

EXAMPLES 5–24
and
Comparative Examples C9–C12

The following modified Spot-Free Drying Test Procedure was used to test the following drying compositions. 300 g of drying composition (containing HFE-7100 hydrofluoroether with either 0.05% or 0.5% by weight surfactant, as shown in Table 3) was added to a 1 L Pyrex™ beaker. The beaker was placed on a hot plate, and a water-cooled copper condensing coil was inserted at the top of the beaker so that the condensing coil ran along the inside perimeter of the beaker. The contents of the beaker was heated to boiling, wherein at equilibrium the condensing coil continually condensed the hydrofluoroether vapors. The test glass slide (VWR Microslide, 25 mm×75 mm) was dipped into deionized water, was immediately thereafter dipped into the boiling spot free drying composition for a time of between 1 to 3 minutes, and finally was brought up into the condensing vapor zone for 1 minute. For some examples, the slide was given an additional HFE-7100 hydrofluoroether rinse cycle for 180 seconds (see Table 3).

Water removal was visually judged using the following 4-point scale:

1—no water or spots
2—only a few small water drops
3—many small water drops
4—many big water drops.

Surfactant residue was visually judged using the following 5-point scale:

1—no visible residue
2—barely visible residue
3—small but visible residue
4—many small spots
5—large stained area.

Surfactant 2 was evaluated using the same modified Spot-Free Drying Test Procedure (Examples 20–24). Also for comparison, FC-171, a comparative surfactant described in TABLE 2, was included in the evaluation (Comparative C9–C12).

Results are presented in TABLE 3.

TABLE 3

| Ex. | Surf Ref. | Surf Conc. | Boil Time | HFE Rinse? | Water Removal | Surfact. Residue |
|---|---|---|---|---|---|---|
| 5 | 7 | 0.05% | 1 min | No | 1 | 2 |
| 6 | 7 | 0.05% | 3 min | No | 1 | 2 |
| 7 | 7 | 0.5% | 1 min | No | 1 | 3 |
| 8 | 7 | 0.5% | 1 min | Yes | 1 | 1 |
| 9 | 7 | 0.5% | 3 min | No | 1 | 3 |
| 10 | 8 | 0.05% | 1 min | No | 4 | 4 |
| 11 | 8 | 0.05% | 3 min | No | 4 | 4 |
| 12 | 8 | 0.5% | 1 min | No | 1 | 3 |
| 13 | 8 | 0.5% | 3 min | No | 1 | 3 |
| 14 | 8 | 0.5% | 3 min | Yes | 1 | 2 |
| 15 | 6 | 0.05% | 1 min | No | 3 | 3 |
| 16 | 6 | 0.05% | 3 min | No | 2 | 3 |
| 17 | 6 | 0.5% | 1 min | No | 1 | 4 |
| 18 | 6 | 0.5% | 3 min | No | 1 | 4 |
| 19 | 6 | 0.5% | 3 min | Yes | 1 | 2 |
| 20 | 2 | 0.05% | 1 min | No | 1 | 2 |
| 21 | 2 | 0.05% | 3 min | No | 1 | 2 |
| 22 | 2 | 0.5% | 1 min | No | 1 | 5 |
| 23 | 2 | 0.5% | 1 min | Yes | 1 | 2 |
| 24 | 2 | 0.5% | 3 min | No | 1 | 5 |
| 24A | 5 | 0.025% | 1 min | Yes | 3 | 3 |
| 24B | 5 | 0.025% | 3 min | Yes | 4 | 3 |
| 24C | 5 | 0.2% | 1 min | Yes | 4 | 3 |
| 24D | 5 | 0.2% | 3 min | Yes | 4 | 3 |
| C9 | FC-171 | 0.05% | 1 min | No | 3 | 3 |
| C10 | FC-171 | 0.05% | 3 min | No | 3 | 3 |
| C11 | FC-171 | 0.5% | 1 min | No | 3 | 3 |
| C12 | FC-171 | 0.5% | 1 min | No | 3 | 3 |

EXAMPLE 25

In Example 25, essentially the same spot-free drying evaluation was run as described in Example 2 with Surfactant 2, except that 3M™ HFE-7200 Specialty Liquid ($C_4F_9OC_2H_5$) was substituted for HFE-7100. The results using HFE-7200, shown below, were similar to the earlier results using HFE 7100:

Solubility of Surfactant 2 in HFE-7200: >2.0% by weight
Drying of Glass Slide: Dry, no spots
Drying of Circuit Board: Dry, no spots
Emulsion/Foam: None

EXAMPLES 26–30

Using the modified Spot-Free Drying Test Procedure employed to generate the data in TABLE 3, drying compositions were formulated with Surfactant 2 dissolved at 0.05% and 0.5% (w/w) in VERTREL™ XF hydrofluorocarbon, (2,3-dihydrodecafluoropentane), available from E. I. duPont de Nemours and Co., Wilmington, Del.

In Example 26, the drying composition contained 0.05% (w/w) Surfactant 2 in VERTREL™ XF hydrofluorocarbon, the test glass slide was dipped in the boiling composition for 1 minute followed by a 1 minute exposure in the condensing vapor zone. No rinse cycle was used.

In Example 27, the same procedure was followed as in Example 26 except that the test glass slide was dipped in the boiling composition for 3 minutes.

In Example 28, the drying composition contained 0.5% (w/w) Surfactant 2 in VERTREL™ XF hydrofluorocarbon, the test glass slide was dipped in the boiling composition for 1 minute, followed by a 1 minute exposure in the condensing vapor zone, followed by a rinse cycle using XF hydrofluorocarbon.

In Example 29, the drying composition contained 0.5% (w/w) Surfactant 2 in VERTREL™ XF hydrofluorocarbon, the test glass slide was dipped in the boiling composition for 3 minutes, followed by a 1 minute exposure in the condensing vapor zone, followed by a rinse cycle using HFE-7100 hydrofluoroether.

In Example 30, the drying composition contained 0.5% (w/w) Surfactant 2 in HFE-7100 hydrofluoroether, the test glass slide was dipped in the boiling composition for 3 minutes, followed by a 1 minute exposure in the condensing vapor zone, followed by a rinse cycle using VERTREL™ XF hydrofluorocarbon.

Results are presented in TABLE 5.

TABLE 5

| Ex. | Surfactant | Surf. Conc. | Boil Time | Water Removal | Surf. Residue | Rinse? | Surf. Residue |
|---|---|---|---|---|---|---|---|
| 26 | 2 | 0.05% in XF | 1 min | 1 | 2 | No | — |
| 27 | 2 | 0.05% in XF | 3 min | 1 | 2 | No | — |
| 28 | 2 | 0.5% in XF | 1 min | 1 | 5 | Yes, in XF | 1 |
| 29 | 2 | 0.5% in XF | 1 min | 1 | 5 | Yes, in 7100 | 1 |
| 30 | 2 | 0.5% in 7100 | 3 min | 1 | 5 | Yes, in XF | 1 |

EXAMPLES 31–34

Using the modified Spot-Free Drying Test Procedure employed to generate the data in TABLE 3, drying compositions were formulated with Surfactant 2 dissolved at 0.05% and 0.5% (w/w) in 3M™ PF-5052 Performance Liquid, (perfluoro-4-methylmorpholine), PFC available from 3M Company. The rinsing composition consisted of pure PF-5052 and was used in each of the examples.

In Example 31, the drying composition contained 0.05% (w/w) Surfactant 2, and the test glass slide was dipped in the boiling composition for 1 minute followed by a 1 minute exposure in the condensing vapor zone.

In Example 32, the drying composition contained 0.05% (w/w) Surfactant 2, and the test glass slide was dipped in the boiling composition for 3 minutes followed by a 1 minute exposure in the condensing vapor zone.

In Example 33, the drying composition contained 0.5% (w/w) Surfactant 2, and the test glass slide was dipped in the boiling composition for 1 minute followed by a 1 minute exposure in the condensing vapor zone.

In Example 34, the drying composition contained 0.5% (w/w) Surfactant 2, and the test glass slide was dipped in the boiling composition for 3 minutes followed by a 1 minute exposure in the condensing vapor zone.

Results are presented in TABLE 6.

TABLE 6

| Ex. | Surfactant | Surf. Conc. | Boil Time | Water Removal | Surf. Residue Before Rinse | Surf. Residue After Rinse |
|---|---|---|---|---|---|---|
| 31 | 2 | 0.05% | 1 | 2 | 3 | 2 |
| 32 | 2 | 0.05% | 3 | 1 | 3 | 2 |
| 33 | 2 | 0.5% | 1 | 1 | 4 | 1 |
| 34 | 2 | 0.5% | 3 | 1 | 4 | 1 |

We claim:

1. A composition comprising fluorinated solvent and nonionic, poly-fluoroalkyl, hydroxy-substituted surfactant.

2. The composition of claim 1 wherein the fluorinated solvent can absorb less than 1% by weight water, and the composition, when agitated, does not form a stable emulsion or foam.

3. The composition of claim 1 wherein the fluorinated solvent comprises a hydrofluoroether, a hydrofluorocarbon, a perfluorocarbon, a hydrochlorofluoroether, a chlorofluorocarbon, a hydrochlorofluorocarbon, or a mixture thereof.

4. The composition of claim 1 wherein the fluorinated solvent is a hydrofluoroether.

5. The composition of claim 4 wherein the hydrofluoroether is represented by the formula:

wherein:
$R_f$ is selected from the group consisting of a linear or branched perfluoroalkyl group having from about 2 to 15 carbon atoms, a perfluorocycloalkyl-containing perfluoroalkyl group having from about 5 to 15 carbon atoms, and a perfluorocycloalkyl group having from about 3 to 12 carbon atoms; and
$R_h$ is selected from the group consisting of a linear or branched alkyl group having from 1 to about 8 carbon atoms, a cycloalkyl-containing alkyl group having from about 4 to about 8 carbon atoms, and a cycloalkyl group having from about 3 to about 8 carbon atoms.

6. The composition of claim 5 wherein $R_f$ is a linear or branched perfluoroalkyl groups having from 3 to 8 carbon atoms.

7. The composition of claim 5 wherein $R_h$ is an alkyl group having from 1 to 3 carbon atoms.

8. The composition of claim 5 wherein the hydrofluoroether is selected from the group consisting of n-$C_3F_7OCH_3$, $(CF_3)_2CFOCH_3$, n-$C_4F_9OCH_3$, $(CF_3)_2CFCF_2OCH_3$, n-$C_4F_9OC_2H_5$, $(CF_3)_2CFCF_2OC_2H_5$, $(CF_3)_3COCH_3$, $CH_3O(CF_2)_4OCH_3$, $CH_3O(CF_2)_6OCH_3$, and mixtures thereof.

9. The composition of claim 1 wherein the fluorinated solvent is hydrofluorocarbon.

10. The composition of claim 1 wherein the fluorinated solvent is a perfluorocarbon.

11. The composition of claim 1 wherein the surfactant comprises a poly-fluoroalkyl, poly-hydroxy-substituted surfactant.

12. The composition of claim 1 wherein the surfactant comprises a di-fluoroalkyl, di- or tri-hydroxy-substituted surfactant.

13. The composition of claim 1 wherein the surfactant comprises:

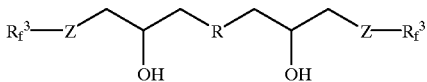

wherein
- each $R_f^3$ is independently a linear, branched, or cyclic fluoroalkyl;
- each Z is independently a divalent linking group chosen from the group consisting of —SO$_2$N(R2)—, —C(O)N(R2)—, —(CH$_2$)$_n$O—(n=1 to 3), and —C$_2$H$_4$SO$_2$N(R2)—, wherein R2 is an alkyl;
- and R is selected from

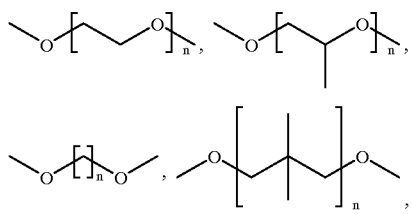

wherein n = 1–6,

wherein n = 1–15, and

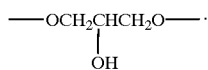

14. The composition of claim 13 wherein the surfactant comprises:

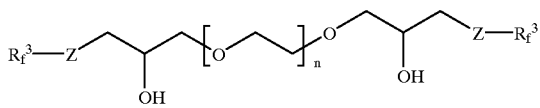

wherein each Z is

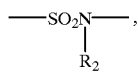

wherein
- R$_2$ is ethyl or methyl, or —(CH$_2$)O—;
- $R_f^3$ is a C$_4$ to C$_8$ alkyl, and
- n is from 1 to 4.

15. The composition of claim 13, wherein the surfactant is represented by the formula

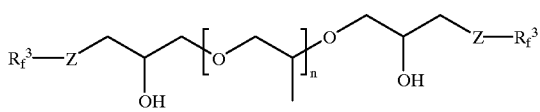

wherein each Z is

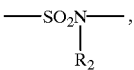

wherein
- R$_2$ is ethyl or methyl, or —(CH$_2$)O—;
- $R_f^3$ is a C$_4$ to C$_8$ alkyl, and
- n is from 1 to 4.

16. The composition of claim 13, wherein the surfactant comprises

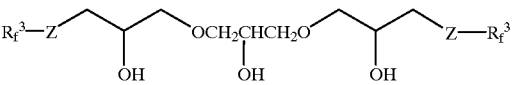

wherein each Z is

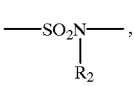

wherein
- R$_2$ is ethyl or methyl, or —(CH$_2$)O—;
- $R_f^3$ is a C$_2$ to C$_8$ alkyl.

17. The composition of claim 13, wherein the surfactant comprises

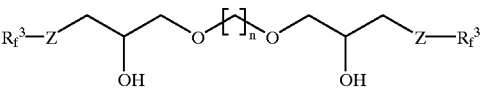

wherein each Z is

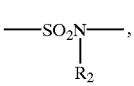

wherein
- R$_2$ is ethyl or methyl, or —(CH$_2$)O—;
- $R_f^3$ is a C$_4$ to C$_8$ alkyl, and
- n is from 2 to 6.

18. The composition of claim 13, wherein the surfactant comprises

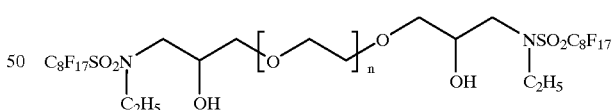

wherein n = 1 or 2.

19. The composition of claim 13, wherein the surfactant comprises

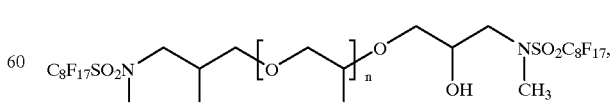

wherein n=1 to 4.

20. The composition of claim 1 wherein the surfactant is chosen from the group consisting of:

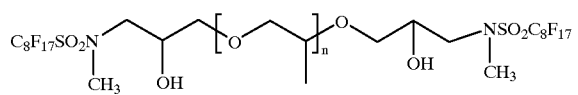
wherein n = 1-6
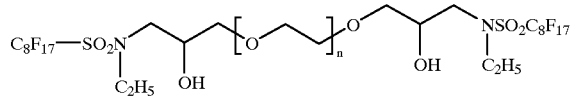
wherein n = 1-6
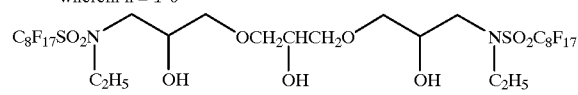
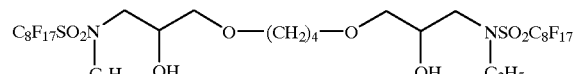
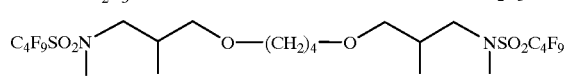
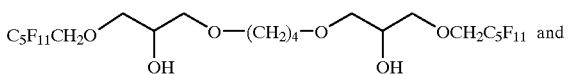
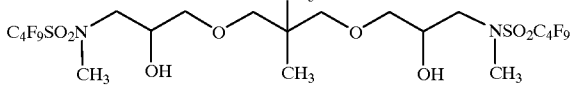
21. The composition of claim 1 wherein the surfactant is present in an amount from about 0.025 to about 5 wt % based on the weight of the fluorinated solvent.
22. The composition of claim 1 wherein the surfactant is present in an amount from about 0.05 to about 2 wt % based on the weight of the fluorinated solvent.
* * * * *

UNITED STATES PATENT AND TRADEMARK OFFICE
CERTIFICATE OF CORRECTION

PATENT NO. : 6,297,308 B1
DATED : October 2, 2001
INVENTOR(S) : Jariwala, Chetan P.

It is certified that error appears in the above-identified patent and that said Letters Patent is hereby corrected as shown below:

Column 2,
Line 21, delete "(HEFEs)" and insert in place thereof -- (HHFEs) --.

Column 20,
Lines 58-60, delete "n-$C_3F_7OCH_3$, $(CF_3)_2CFOCH_3$, n-$C_4F_9OCH_3$, $(CF_3)_2CFCF_2OCH_3$, n-$C_4F9OC_2H_5$, $(CF_3)_2CFCF_2OC_2H_5$, $(CF_3)_3COCH_3$, $CH_3O(CF_2)_4OCH_3$, $CH_3O(CF_2)_6OCH_3$" and insert in place thereof -- n-$C_3F_7OCH_3$, $(CF_3)_2CFOCH_3$, n-$C_4F_9OCH_3$, $(CF_3)_2CFCF_2OCH_3$, n-$C_4F_9OC_2H_5$, $(CF_3)_2CFCF_2OC_2H_5$, $(CF_3)_3COCH_3$, $CH_3O(CF_2)_4OCH_3$, $CH_3O(CF_2)_6OCH_3$ --

Signed and Sealed this

Second Day of July, 2002

Attest:

Attesting Officer

JAMES E. ROGAN
*Director of the United States Patent and Trademark Office*